(12) United States Patent
Wada et al.

(10) Patent No.: US 10,270,970 B2
(45) Date of Patent: Apr. 23, 2019

(54) IMAGING DEVICE INCLUDING MAIN-BODY-SIDE LOOP ANTENNA, TILT-SIDE LOOP ANTENNA AND RELAY LOOP ANTENNA

(71) Applicant: Panasonic Intellectual Property Management Co., Ltd., Osaka (JP)

(72) Inventors: Jyouji Wada, Osaka (JP); Hiroaki Haraguchi, Osaka (JP); Hirohito Tsuruta, Osaka (JP); Toshihisa Tsuda, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/558,408

(22) PCT Filed: Feb. 3, 2016

(86) PCT No.: PCT/JP2016/000543
§ 371 (c)(1),
(2) Date: Sep. 14, 2017

(87) PCT Pub. No.: WO2016/151993
PCT Pub. Date: Sep. 29, 2016

(65) Prior Publication Data
US 2018/0063432 A1   Mar. 1, 2018

(30) Foreign Application Priority Data

Mar. 23, 2015   (JP) ................................. 2015-060134

(51) Int. Cl.
*H04N 5/232* (2006.01)
*G08B 13/196* (2006.01)
(Continued)

(52) U.S. Cl.
CPC ..... *H04N 5/23241* (2013.01); *G08B 13/1963* (2013.01); *H04N 5/2252* (2013.01);
(Continued)

(58) Field of Classification Search
CPC ............ H04N 5/23241; H04N 5/2252; H04N 5/2254; G08B 13/1963
See application file for complete search history.

(56) References Cited

U.S. PATENT DOCUMENTS

2007/0182827 A1   8/2007   Sassa
2010/0007744 A1*  1/2010   Oosawa ............... H04N 5/2251
                                                          348/207.1
2011/0037863 A1   2/2011   Mihota et al.

FOREIGN PATENT DOCUMENTS

JP   2006-145983   6/2006
JP   2007-201576   8/2007
(Continued)

OTHER PUBLICATIONS

International Search Report dated Apr. 12, 2016 in International (PCT) Application No. PCT/JP2016/000543.

*Primary Examiner* — Ahmed A Berhan
(74) *Attorney, Agent, or Firm* — Wenderoth, Lind & Ponack, L.L.P.

(57) ABSTRACT

To suppress an increase in a running cost while improving a transmission amount of information and reliability. Surveillance camera includes main body portion in which power supply board and data processing board are provided; pan portion that rotates in a pan direction with respect to main body portion; tilt portion that is provided with camera and rotates in a tilt direction with respect to pan portion; main-body-side loop antenna that is fixed to main body portion; tilt-side loop antenna that is fixed to tilt portion; and relay loop antenna that is fixed to pan portion and in which main-body-opposite-side loop portion opposite to main-
(Continued)

body-side loop antenna and tilt-opposite-side loop portion opposite to tilt-side loop antenna are connected to each other in series.

2 Claims, 9 Drawing Sheets

(51) Int. Cl.
*H04N 7/18* (2006.01)
*H04N 5/225* (2006.01)
*H01Q 1/22* (2006.01)
*H01Q 7/00* (2006.01)
*H01Q 1/27* (2006.01)

(52) U.S. Cl.
CPC ....... *H04N 5/2254* (2013.01); *H04N 5/23203* (2013.01); *H04N 5/23206* (2013.01); *H04N 5/23238* (2013.01); *H04N 7/183* (2013.01); *H04N 7/185* (2013.01); *H01Q 1/22* (2013.01); *H01Q 1/27* (2013.01); *H01Q 7/00* (2013.01)

(56) References Cited

FOREIGN PATENT DOCUMENTS

| JP | 2008-136099 | | 6/2008 |
|----|-------------|---|--------|
| JP | 2008136099 A | * | 6/2008 |
| JP | 2011-39340 | | 2/2011 |
| JP | 2013-30968 | | 2/2013 |

* cited by examiner

FIG. 5

|  | PAN | TILT |
|---|---|---|
| POWER | SLIP RING | TWISTED LINE |
| DATA | PLC | PLC |
| 360-DEGREE ROTATION | ALLOWED | NOT ALLOWED |
| THICKNESS OF ROTATION SHAFT | EXTREMELY THIN | THIN |

THICKNESS OF ROTATION SHAFT: EXTREMELY THIN<THIN<MEDIUM<THICK

FIG. 7

|  | PAN | TILT |
|---|---|---|
| POWER | SLIP RING | TWISTED LINE |
| DATA | SLIP RING | TWISTED LINE |
| 360-DEGREE ROTATION | ALLOWED | NOT ALLOWED |
| THICKNESS OF ROTATION SHAFT | MEDIUM | THICK |

THICKNESS OF ROTATION SHAFT: EXTREMELY THIN<THIN<MEDIUM<THICK

FIG. 9

|  | PAN | TILT |
|---|---|---|
| POWER | SLIP RING | SLIP RING |
| DATA | PLC | PLC |
| 360-DEGREE ROTATION | ALLOWED | ALLOWED |
| THICKNESS OF ROTATION SHAFT | EXTREMELY THIN | EXTREMELY THIN |

THICKNESS OF ROTATION SHAFT: EXTREMELY THIN<THIN<MEDIUM<THICK

IMAGING DEVICE INCLUDING MAIN-BODY-SIDE LOOP ANTENNA, TILT-SIDE LOOP ANTENNA AND RELAY LOOP ANTENNA

This application is a U.S. national stage application of the PCT International Application No. PCT/JP2016/000543 filed on Feb. 3, 2016, which claims the benefit of foreign priority of Japanese patent application 2015-060134 filed on Mar. 23, 2015, the contents all of which are incorporated herein by reference.

TECHNICAL FIELD

The present disclosure relates to an imaging device that images an object with a variable optical axis.

BACKGROUND ART

As an imaging device that images an object with a variable optical axis, for example, a surveillance camera is provided with a pan portion which endlessly rotates in a pan direction around a rotation shaft in the pan direction (pan rotation shaft) with respect to a main body portion, and a tilt portion on which a camera is mounted and which rotates (swings) in a tilt direction around a rotation shaft in the tilt direction (tilt rotation shaft) perpendicular to the pan rotation shaft (for example, refer to PTL 1). Thus, the surveillance camera can image an object in most ranges excluding a portion in the tilt rotation direction.

In related art, most pan portions which rotate in the pan direction transmit and receive power and data to and from the camera, by using a contact-type slip ring. On the other hand, a twisted line is inserted into the tilt portion which rotates in the tilt direction, and thus the twisted line is twisted and rotated according to the rotation in the tilt direction. This is because generally the rotation in the tilt direction is not endless rotation but swing rotation.

CITATION LIST

Patent Literature

PTL 1: Japanese Patent Unexamined Publication No. 2013-30968

SUMMARY OF THE INVENTION

The present disclosure provides an imaging device including: a main body portion in which a power supply unit and a data processing unit are provided; a pan portion that rotates in a pan direction with respect to the main body portion; a tilt portion that is provided with a camera and rotates in a tilt direction with respect to the pan portion; a main-body-side loop antenna that is fixed to the main body portion; a tilt-side loop antenna that is fixed to the tilt portion; and a relay loop antenna that is fixed to the pan portion and in which a main-body-opposite-side loop portion opposite to the main-body-side loop antenna and a tilt-opposite-side loop portion opposite to the tilt-side loop antenna are connected to each other in series.

According to the present disclosure, it is possible to suppress an increase in a running cost while improving a transmission amount of information and reliability.

BRIEF DESCRIPTION OF DRAWINGS

FIG. 5 is an explanatory diagram representing specifications of power, data, rotation, and rotation shafts in a pan portion and a tilt portion of the imaging device illustrated in FIG. 1.

FIG. 7 is an explanatory diagram representing specifications of power, data, rotation, and rotation shafts in a pan portion and a tilt portion of the imaging device according to the comparative example of the present embodiment.

FIG. 9 is an explanatory diagram representing specifications of power, data, rotation, and rotation shafts in a pan portion and a tilt portion of the imaging device according to the modification example of the present embodiment.

DESCRIPTION OF EMBODIMENTS

Prior to explanations of embodiments, the problems in the related art will be briefly described. In a case of performing data transmission using a slip ring, there is a problem that it is difficult to transmit and receive image data with high image quality (for example, 4K image quality or 8K image quality) due to noise and unnecessary radiation.

In addition, in a structure in which a twisted line is inserted into a tilt rotation portion, the twisted line configured with a plurality of electric wires is inserted into a tilt rotation shaft, and as a result, a diameter of the tilt rotation shaft becomes large. In a case of outdoor use, a surveillance camera is generally waterproofed by being covered with a dome cover. On the other hand, there is also a waterproof surveillance camera without using a dome cover. In the latter case, for example, since the tilt portion is exposed to outside air, the tilt portion is configured with a waterproof structure using a waterproof sealing member (for example, an O ring, or the like). However, since the diameter of the tilt rotation shaft into which the twisted line is inserted becomes large, when the tilt rotation shaft is made watertight with the waterproof sealing member, a frictional force increases and a load for rotating the tilt portion increases. As a result, there is a problem that a size of a tilt motor becomes larger and a running cost increases.

The present disclosure has been proposed in view of the above-mentioned situation in the related art, and an object thereof is to provide an imaging device that can suppress an increase in the running cost while improving a transmission amount of information and reliability.

Hereinafter, an embodiment (hereinafter, referred to as "present embodiment") in which an imaging device according to the present disclosure is specifically disclosed will be described with reference to the drawings. Surveillance camera 11 will be described below as an example of the imaging device according to the present embodiment.

Figure 1:
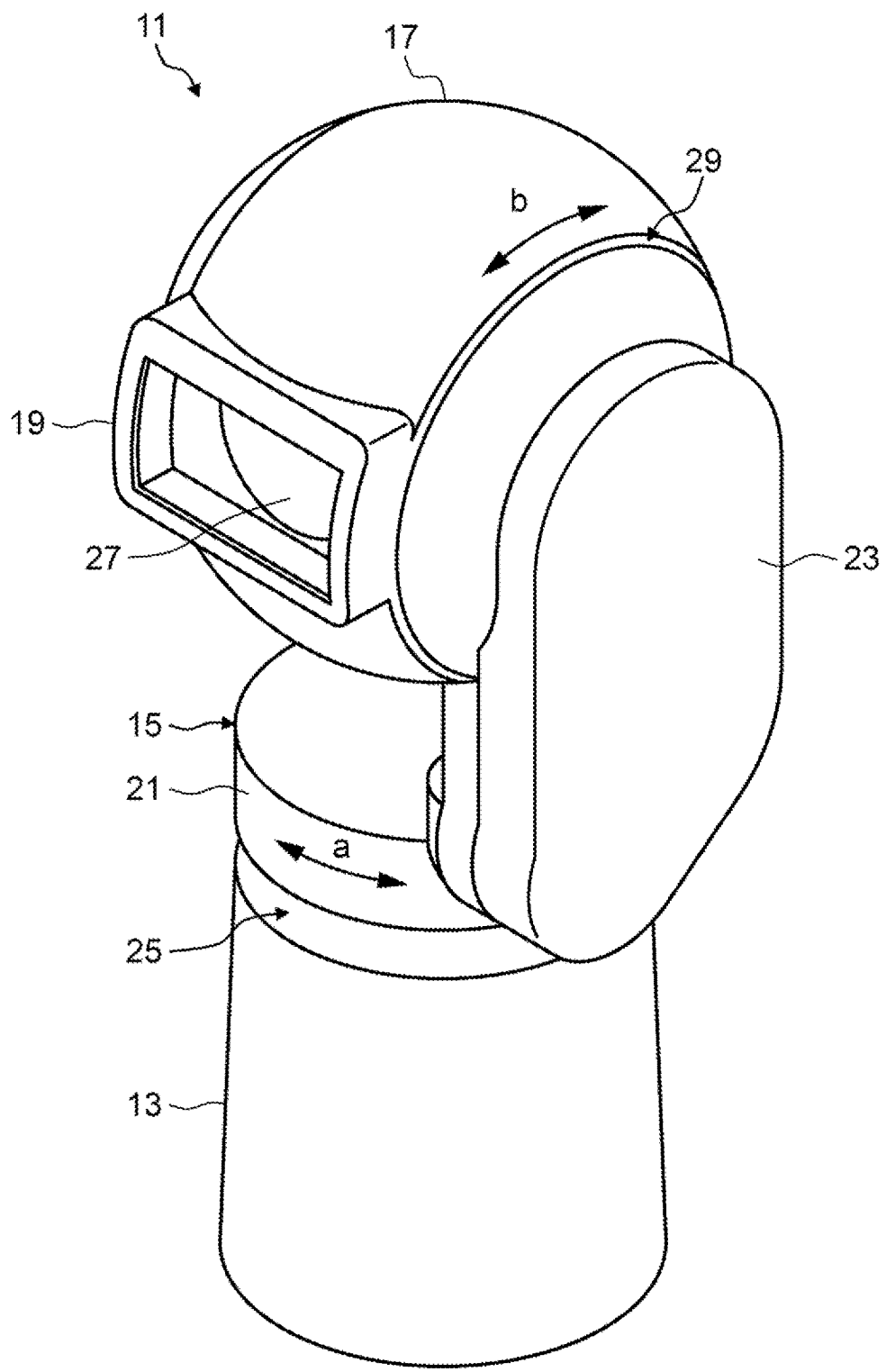
FIG. 1 is a perspective view illustrating an appearance of an imaging device according to the present embodiment.

FIG. 1 is an external perspective view of surveillance camera 11 according to the present embodiment. Surveillance camera 11 illustrated in FIG. 1 is configured to include main body portion 13, pan portion 15, and tilt portion 17. A lower surface of main body portion 13 (that is, a surface on a lower side of the paper of FIG. 1) is fixed to an installation surface by a fastener such as a bolt. Camera 19 is mounted on tilt portion 17.

Main body portion 13 is formed in a substantially columnar shape in which the installation surface is slightly larger in diameter than a surface opposite to the installation surface. Pan portion 15 includes pan turning base 21, and arm portion 23 that erects from a side portion of pan turning base 21 and rotates integrally with pan turning base 21 in a pan direction (refer to arrow a illustrated in FIG. 1). Pan turning base 21 is supported on an upper surface of main body portion 13 (that is, a surface on an upper side of the paper of FIG. 1) so as to be freely rotatable in the pan direction. Hereinafter, a boundary between main body portion 13 and pan turning base 21 is referred to as a "pan rotation portion 25".

Tilt portion 17 is formed in a substantially spherical shape. Tilt portion 17 is supported to an erection end of arm portion 23 such that one end of tilt portion 17 in a diameter direction is freely rotatable in a tilt direction (refer to arrow b illustrated in FIGS. 1 and 3). In camera 19, lens 27 is disposed on the outside of tilt portion 17 in a radial direction perpendicular to the diameter of tilt portion 17. Hereinafter, a boundary between arm portion 23 and tilt portion 17 is referred to as a "tilt rotation portion 29".

Figure 2:
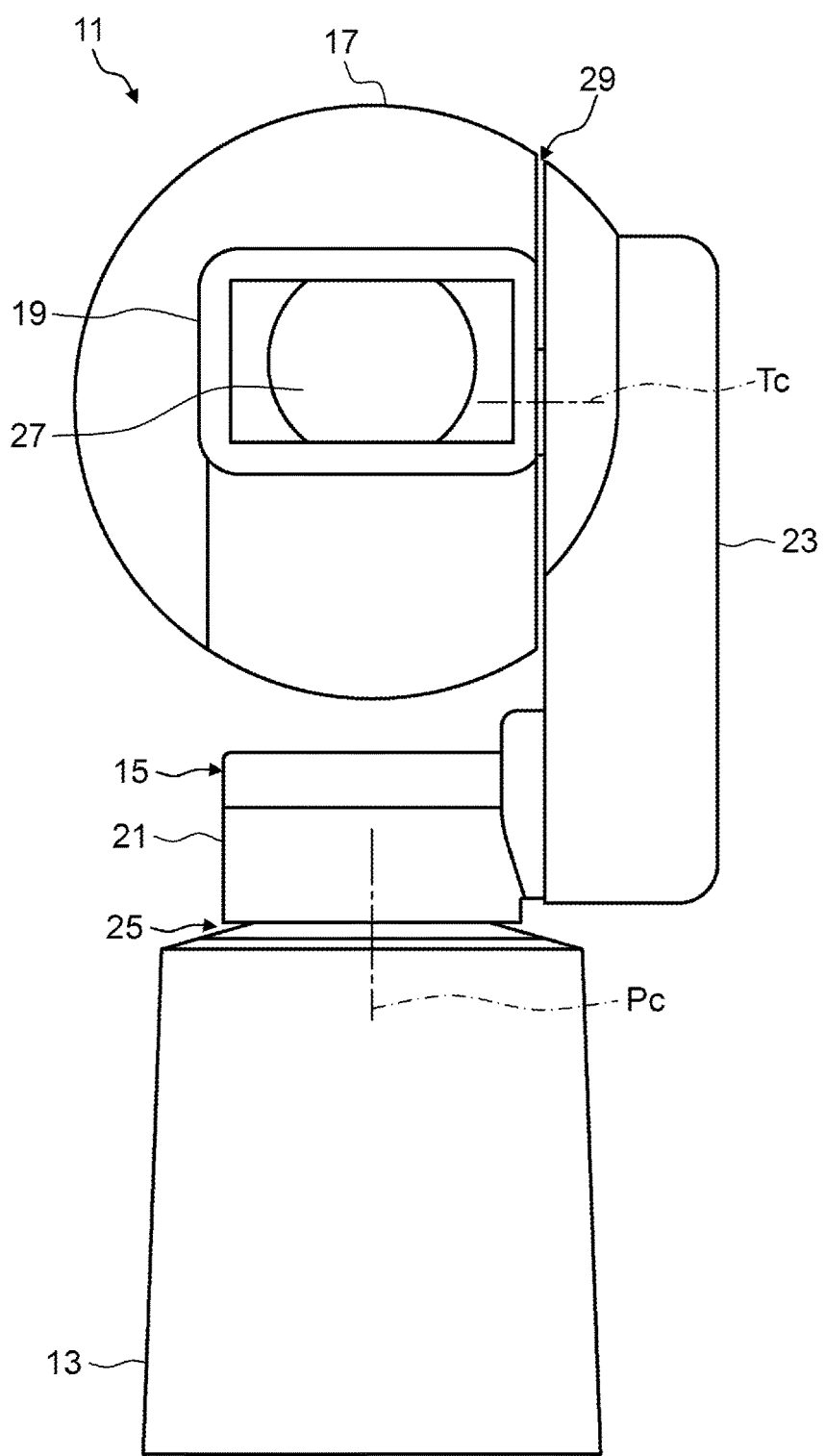
FIG. 2 is a front view of the imaging device illustrated in FIG. 1.

FIG. 2 is a front view of surveillance camera 11 illustrated in FIG. 1. The front of surveillance camera 11 indicates a side on which lens 27 of camera 19 is disposed. In tilt portion 17, a portion having a spherical shape is cut from a surface perpendicular to tilt rotation center Tc of tilt rotation portion 29. The portion is formed integrally with arm portion 23. Arm portion 23 supports tilt portion 17 by the portion integrally formed. Tilt portion 17 is supported by arm portion 23 being separated from pan turning base 21. In surveillance camera 11, the axis of main body portion 13 is substantially coincident with pan rotation center Pc of pan rotation portion 25. Pan turning base 21 is formed in a substantially rectangular shape in a plan view. Pan turning base 21 is formed to have a width dimension smaller than the diameter of main body portion 13 in a direction along a direction in which arm portion 23 is provided (right direction in the paper of FIG. 2). Lens 27 of camera 19 is disposed being slightly shifted to an upper side of tilt rotation center Tc (side opposite to pan portion 15).

Figure 3:
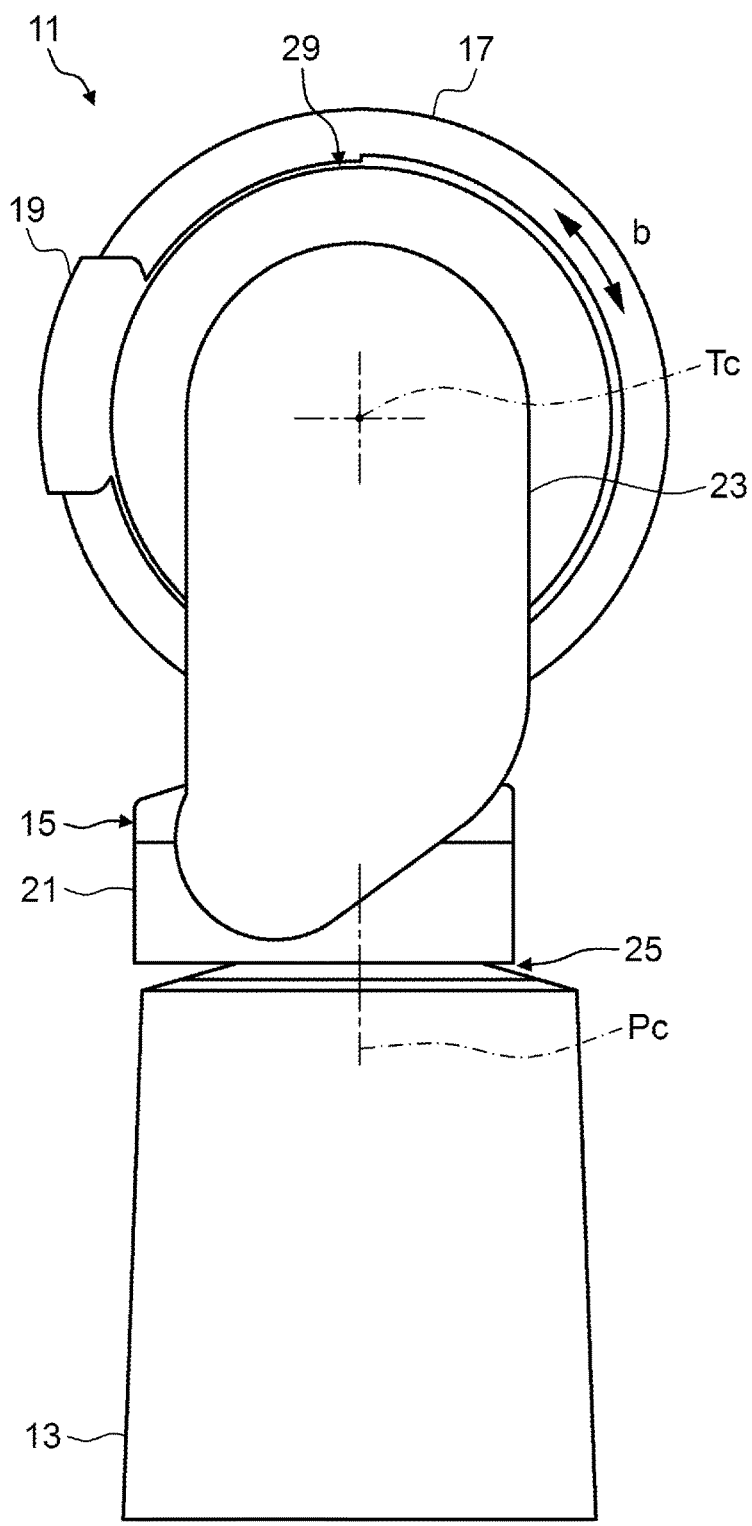
FIG. 3 is a side view of the imaging device illustrated in FIG. 1.

FIG. 3 is a side view of surveillance camera 11 illustrated in FIG. 1. Surveillance camera 11 is formed to have a depth dimension smaller than the diameter of main body portion 13 in a direction perpendicular to the width direction of pan turning base 21 (lateral direction in the paper of FIG. 3). One end surface of pan turning base 21 in a depth direction (left end surface in the sheet of FIG. 3) substantially coincides with an outer peripheral surface of main body portion 13. In other words, the center of pan turning base 21 is disposed being shifted from the axis of main body portion 13. In addition, tilt portion 17 is formed to have a diameter larger than the diameter of main body portion 13.

In surveillance camera 11, pan portion 15 rotates around pan rotation center Pc of pan rotation portion 25 in a pan rotation (endless rotation) manner. In addition, in surveillance camera 11, tilt portion 17 rotates (swings) around tilt rotation center Tc of tilt rotation portion 29 that is perpendicular to pan rotation center Pc with respect to pan portion 15, in a tilt rotation manner. Pan rotation portion 25 and tilt rotation portion 29 have a watertight structure. That is, pan rotation portion 25 and tilt rotation portion 29 are configured with a waterproof structure in which a gap between a shaft and a bearing is closed by a waterproof sealing member which contacts with the shaft and the bearing. Thereby, surveillance camera 11 can be used outdoors, for example, without being covered with a dome cover.

In surveillance camera 11, data such as imaging information or a motor control signal is transmitted between pan rotation portion 25 and tilt rotation portion 29 by non-contact communication, for example, power line communication (PLC) using an antenna. In the present embodiment, in pan rotation portion 25, a slip ring is used for power transmission which is unlikely to be influenced by noise and uses a small number of electrodes. In addition, in the present embodiment, in tilt rotation portion 29, a twisted line is used for power transmission.

Figure 4:
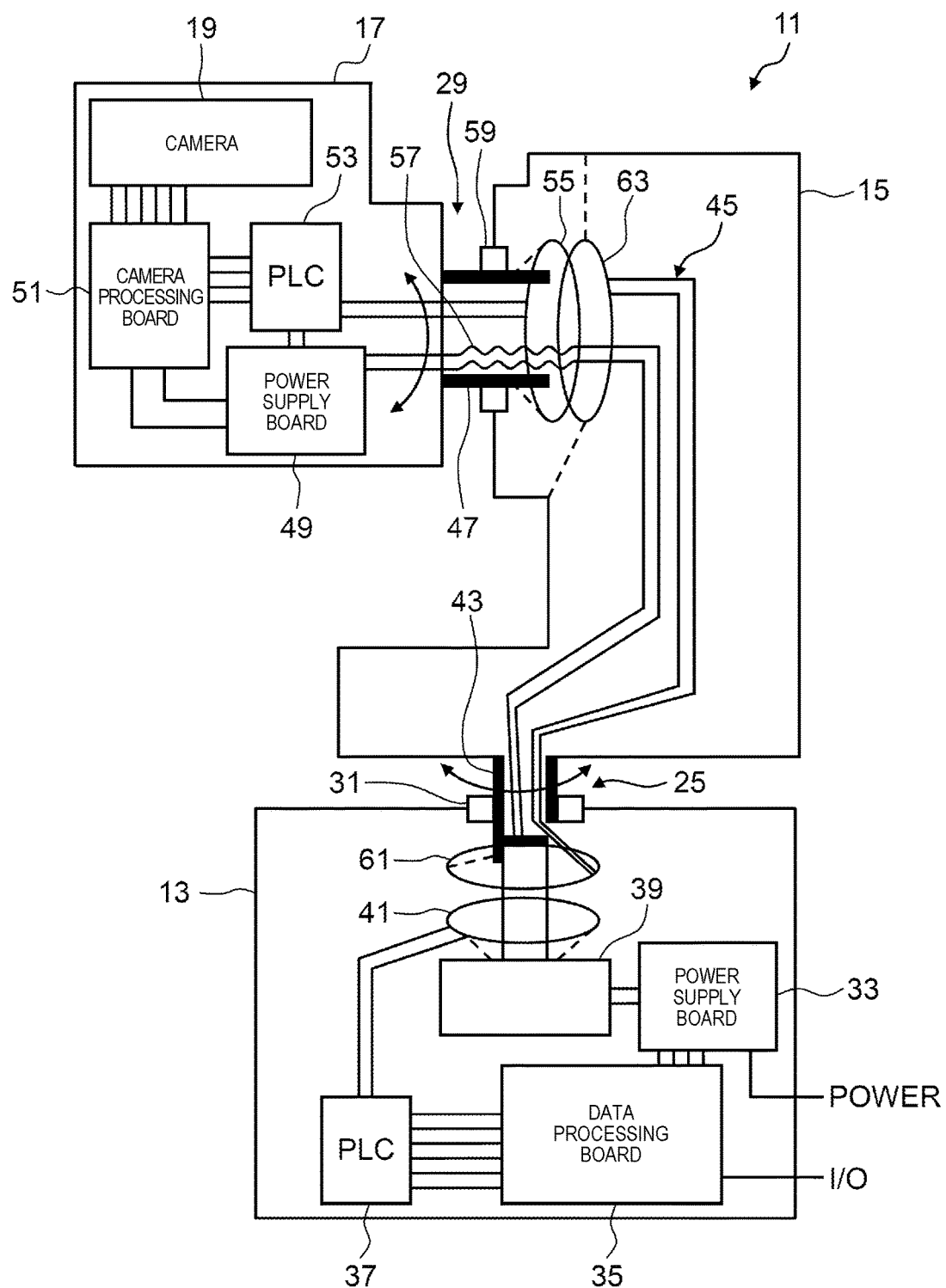
FIG. 4 is a block diagram of the imaging device illustrated in FIG. 1.

FIG. 4 is a block diagram of surveillance camera 11 illustrated in FIG. 1. Main body portion 13 is configured to include pan bearing 31, power supply board 33 as an example of a power supply unit, data processing board 35 as an example of a data processing unit, PLC board 37, slip ring 39, and main-body-side loop antenna 41. Pan bearing 31 supports pan rotation shaft 43 such that pan rotation shaft 43 is freely rotatable.

For pan bearing 31, a rolling bearing such as a radial bearing, a thrust bearing, or an angular bearing is used.

Power supply board 33 is supplied with, for example, commercial power from the outside. Power supply board 33 supplies the supplied power to data processing board 35 and slip ring 39.

Data processing board 35 is connected to power supply board 33, PLC board 37, and external input/output unit (I/O). Data processing board 35 performs control such that a PLC signal is transmitted to pan portion 15 and tilt portion 17 via PLC board 37 and main-body-side loop antenna 41. For example, data processing board 35 transmits a signal for controlling an operation of camera 19. The operation of camera 19 is, for example, a pan operation, a tilt operation, a zoom operation of an optical unit, or the like. In addition, data processing board 35 performs control so as to receive a PLC signal transmitted from camera 19 via main-body-side loop antenna 41 and PLC board 37. For example, data processing board 35 receives image data (including both or one of a still image and a moving image) imaged by camera 19.

In addition, data processing board 35 may control an operation of PLC board 37 by control from an external apparatus (not illustrated). Thereby, data processing board 35 can remotely control camera 19. In addition, data processing board 35 transmits the image data to the external apparatus, and thus a user can easily confirm the transmitted image data by using a his/her own personal computer (PC) at a remote place.

On PLC board 37, electronic components for processing the PLC signal, are mounted. PLC board 37 mutually communicates with relay loop antenna 45 by using main-body-side loop antenna 41 so as to transmit and receive predetermined information. The predetermined information includes, for example, information (image signal) of an image which is imaged by camera 19, or a signal for controlling the operation of camera 19.

Main-body-side loop antenna 41 and relay loop antenna 45 perform non-contact communication according to a communication format of, for example, PLC communication. In the PLC communication, communication of a signal, which is similar to a signal used in communication using a power line (cable), is performed. Here, a communication method of the non-contact communication includes, for example, a radio wave reflection method, and an electromagnetic induction method.

In the PLC communication, for example, a band of 2 MHz to 28 MHz is used, and communication is performed using a minute voltage or a minute current. Each of main-body-side loop antenna 41 and relay loop antenna 45 operates as a coupler. A distance between main-body-side loop antenna 41 and relay loop antenna 45 is, for example, approximately 1 cm to 10 cm.

Slip ring 39 transmits power from power supply board 33 to pan portion 15. A shaft portion of slip ring 39 is freely rotatable with respect to a housing of slip ring 39. The housing is fixed to main body portion 13, and a power line from power supply board 33 is connected to the housing. The shaft portion rotates integrally with pan rotation shaft 43 by being fixed to pan rotation shaft 43. A power supply line from pan portion 15 is connected to the shaft portion. In slip ring 39, each brush provided in the housing is brought into contact with a plurality of ring electrodes provided on an outer circumference of the shaft portion. Thereby, slip ring 39 transmits power by being contacted with pan rotation portion 25.

Main-body-side loop antenna 41 is fixed to main body portion 13. Main-body-side loop antenna 41 is fixed to, for example, the housing of slip ring 39 so as to be disposed concentrically with pan rotation shaft 43.

Tilt portion 17 includes tilt rotation shaft 47, power supply board 49, camera processing board 51, PLC board 53, camera 19, and tilt-side loop antenna 55.

Tilt rotation shaft 47 rotates integrally with tilt portion 17 by being fixed to tilt portion 17.

Power supply board 49 is connected to twisted line 57. Twisted line 57 is routed to pan portion 15 by passing through the inside of tilt rotation shaft 47. Twisted line 57 which is routed to pan portion 15 is connected to slip ring 39 by passing through the inside of pan rotation shaft 43.

Camera processing board 51 acquires an image signal from the optical unit, and performs image conversion of the image signal into predetermined image data (for example, joint photographic experts group (JPEG) data). In addition, camera processing board 51 transmits the converted image data to PLC board 53, via a transmission interface. The image data includes, for example, moving image data or still image data.

In addition, camera processing board 51 may generate control information based on a user's operation. For example, camera processing board 51 may acquire imaging position information which is input from a monitoring person via an operation unit, from a server that remotely operates surveillance camera 11, and generate pan control information or tilt control information according to the imaging position information.

PLC board 53 is connected to tilt-side loop antenna 55. PLC board 53 mutually communicates with relay loop antenna 45 by using tilt-side loop antenna 55 so as to transmit and receive predetermined information. The predetermined information includes, for example, information (image signal) of an image which is imaged by camera 19, or a signal for controlling the operation of camera 19.

Camera 19 includes the optical unit. The optical unit includes an image sensor (for example, a charge coupled device (CCD), or a complementary metal oxide semiconductor (CMOS)), and generates an image signal. Camera 19 is connected to camera processing board 51, and transmits the generated image signal to camera processing board 51.

Tilt-side loop antenna 55 is connected to PLC board 53. Tilt-side loop antenna 55 rotates integrally with tilt portion 17 by being fixed to tilt portion 17.

Pan portion 15 includes pan rotation shaft 43, relay loop antenna 45, and tilt bearing 59. Tilt bearing 59 supports tilt rotation shaft 47 to pan portion 15 such that tilt rotation shaft 47 is freely rotatable. Relay loop antenna 45 is fixed to pan portion 15. Relay loop antenna 45 is configured by connecting main-body-opposite-side loop portion 61 opposite to main-body-side loop antenna 41 and tilt-opposite-side loop portion 63 opposite to tilt-side loop antenna 55 in series.

In surveillance camera 11, pan portion 15 rotates integrally with pan rotation shaft 43. Main-body-side loop antenna 41 and main-body-opposite-side loop portion 61 are oppositely disposed in parallel in a direction perpendicular to pan rotation shaft 43. In addition, in surveillance camera 11, tilt portion 17 rotates integrally with tilt rotation shaft 47 perpendicular to pan rotation shaft 43. Tilt-side loop antenna 55 and tilt-opposite-side loop portion 63 are oppositely disposed in parallel in a direction perpendicular to tilt rotation shaft 47.

In surveillance camera 11, main-body-opposite-side loop portion 61 of relay loop antenna 45 is fixed to pan rotation shaft 43 which is disposed so as to protrude into the inside of main body portion 13. Thereby, main-body-opposite-side loop portion 61 and main-body-side loop antenna 41 are oppositely disposed in the inside of main body portion 13. In addition, in surveillance camera 11, tilt-side loop antenna 55 is fixed to tilt rotation shaft 47 which is disposed so as to protrude into the inside of pan portion 15. Thereby, tilt-side loop antenna 55 and tilt-opposite-side loop portion 63 of relay loop antenna 45 are oppositely disposed in the inside of pan portion 15.

FIG. 5 is an explanatory diagram representing specifications of power, data, rotation, and rotation shafts in pan portion 15 and tilt portion 17 of surveillance camera 11 illustrated in FIG. 1.

In surveillance camera 11 with the configuration, power transmission in pan portion 15 is performed by slip ring 39, and power transmission in tilt portion 17 is performed by twisted line 57.

In addition, in surveillance camera 11, data transmission in pan portion 15 is performed by PLC communication, and data transmission in tilt portion 17 is performed by PLC communication.

In addition, in surveillance camera 11, endless rotation in pan portion 15 is allowed, and endless rotation in tilt portion 17 is not allowed.

In addition, in surveillance camera 11, a thickness of the rotation shaft of pan portion 15 is extremely thin, and a thickness of the rotation shaft of tilt portion 17 is thin (in the following description, "the thickness of the rotation shaft" has a magnitude relationship of extremely thin<thin<medium<thick).

Next, an operation of surveillance camera 11 according to the present embodiment will be described, in comparison with an operation of a surveillance camera according to a comparative example.

First, prior to description of the operation of surveillance camera 11 according to the present embodiment, surveillance camera 65 according to the comparative example will be described with reference to FIG. 6.

Figure 6:
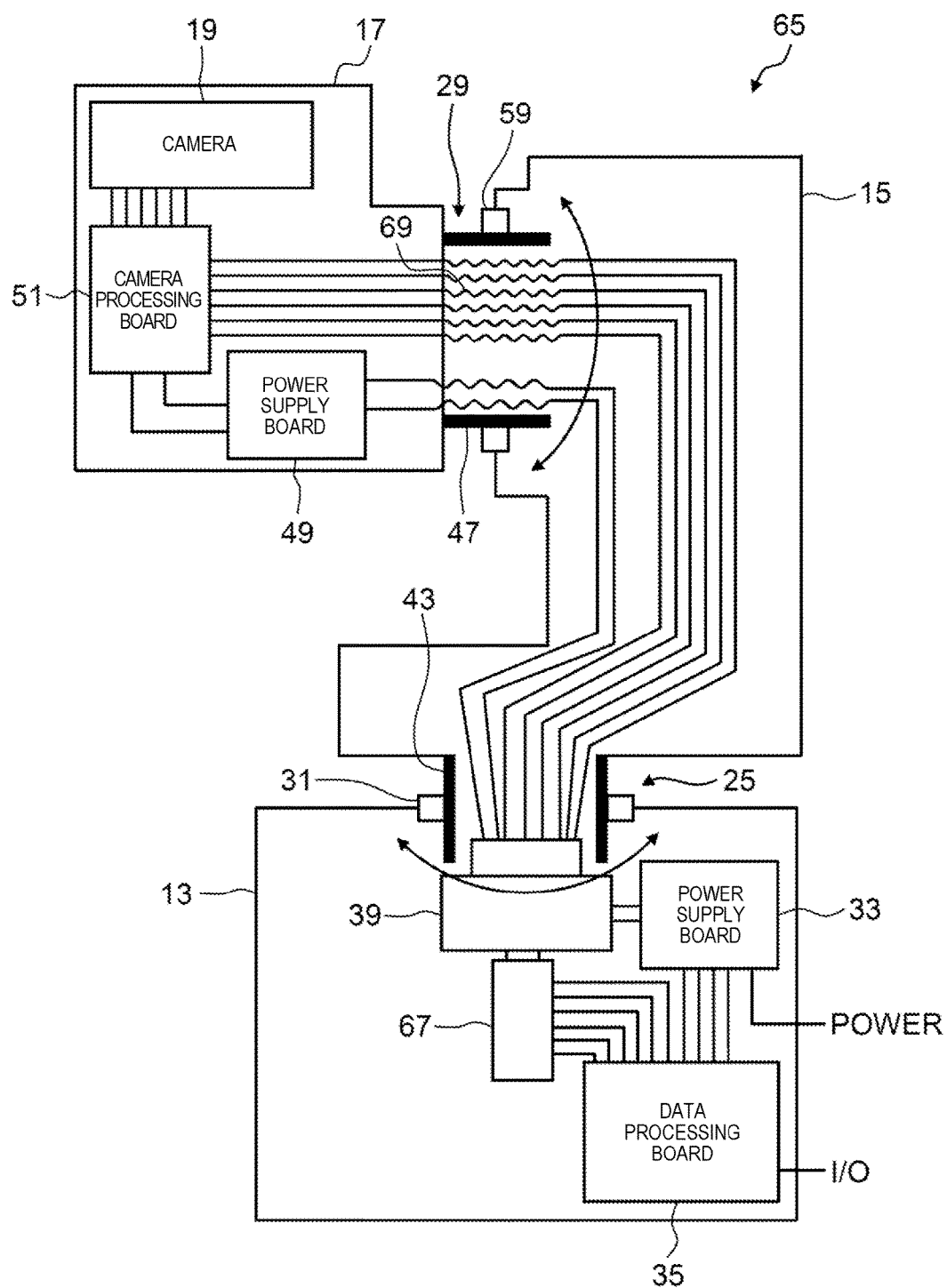
FIG. 6 is a block diagram of an imaging device according to a comparative example of the present embodiment.

FIG. 6 is a block diagram of surveillance camera 65 according to the comparative example of the present embodiment. The same members as those illustrated in FIG. 4 are denoted by the same reference numerals, and repeated explanations are omitted. In surveillance camera 65 according to the comparative example, data transmission in pan rotation portion 25 is performed by slip ring 67. In addition, data transmission in tilt rotation portion 29 is performed by twisted line 69. Thus, main-body-side loop antenna 41, relay loop antenna 45, tilt-side loop antenna 55, PLC board 37, and PLC board 53 are not provided. The other configuration is the same as that of surveillance camera 11.

FIG. 7 is an explanatory diagram representing specifications of power, data, rotation, and rotation shafts in pan portion 15 and tilt portion 17 of surveillance camera 65 according to the comparative example of the present embodiment.

That is, in surveillance camera 65 according to the comparative example, power transmission in pan portion 15 is performed by slip ring 39, and power transmission in tilt portion 17 is performed by twisted line 57.

In addition, in surveillance camera 65, data transmission in pan portion 15 is performed by slip ring 67, and data transmission in tilt portion 17 is performed by twisted line 69.

In addition, in surveillance camera 65, endless rotation in pan portion 15 is allowed, and endless rotation in tilt portion 17 is not allowed.

In addition, in surveillance camera 65, a thickness of the rotation shaft of pan portion 15 is medium, and a thickness of the rotation shaft of tilt portion 17 is thick.

In contrast, as illustrated in FIG. 5, in surveillance camera 11 according to the present embodiment, the thickness of the rotation shaft of pan portion 15 is extremely thin, and the thickness of the rotation shaft of tilt portion 17 is thin.

As described above, in surveillance camera 11 according to the present embodiment, pan portion 15 is provided so as to be freely rotatable in the pan direction with respect to main body portion 13, and tilt portion 17 is provided so as to be freely rotatable in the tilt direction with respect to pan portion 15. Camera 19 is mounted on tilt portion 17. Information such as imaging data and a control signal is transmitted between camera 19 mounted on tilt portion 17 and main body portion 13.

Main body portion 13 includes main-body-side loop antenna 41. Tilt portion 17 includes tilt-side loop antenna 55. Pan portion 15 includes relay loop antenna 45 that can be opposed to both of main-body-side loop antenna 41 and tilt-side loop antenna 55. In surveillance camera 11, information transmission can be made in both of pan rotation portion 25 between main body portion 13 and pan portion 15, and tilt rotation portion 29 between pan portion 15 and tilt portion 17, in a non-contact manner. Thereby, in comparison with a contact-type data communication method in the related art in which expensive slip ring 39 is used in each rotation portion, it is possible to transmit a large amount of information at a high speed, with a low cost, and with high reliability.

In addition, in surveillance camera 11, it is not necessary that the twisted line (twisted line 69) used for information communication in the related art (comparative example) passes through tilt rotation portion 29. Thus, tilt rotation shaft 47 can be small in diameter. Since tilt rotation shaft 47 has a small diameter, the waterproof sealing member for waterproofing tilt rotation shaft 47 also has a small diameter. Since the waterproof sealing member has a small diameter, a friction load on tilt rotation shaft 47 greatly decreases.

Friction torque of oil seal is expressed by the following equation.

$$T = f \cdot Pr \cdot r$$

Here, T indicates friction torque [N·cm (Kgf·cm)], f indicates a friction coefficient, Pr indicates a tension force of a lip portion [N (Kgf)], and r indicates a radius of a shaft [cm].

Thus, downsizing of the tilt motor and power saving can be realized. As the tilt motor is downsized, tilt portion 17 and pan portion 15 can be made compact and lightweight. At the same time, a component cost and the running cost can be reduced.

In addition, relay loop antenna 45 is provided in pan portion 15, and rotates together with pan portion 15. Relay loop antenna 45 is formed integrally by connecting main-body-opposite-side loop portion 61 and tilt-opposite-side loop portion 63 in series.

In relay loop antenna 45, main-body-opposite-side loop portion 61 is opposite to main-body-side loop antenna 41, and tilt-opposite-side loop portion 63 is opposite to tilt-side loop antenna 55. That is, one relay loop antenna 45 can transmit information to both of main-body-side loop antenna 41 and tilt-side loop antenna 55.

Thereby, there is no need to provide both of a loop antenna for the main body portion that corresponds to main-body-side loop antenna 41 and a loop antenna for the tilt portion that corresponds to tilt-side loop antenna 55, that is, a total of four loop antennas. In other words, since one relay loop antenna 45 functions as the loop antenna for the main body portion and the loop antenna for the tilt portion, one loop antenna can be omitted, and thus a total of three loop antennas can be configured. Thereby, a relay circuit which is required in a case where the loop antenna for the tilt portion is provided, can be omitted. In addition, antenna lines in pan portion 15 are simplified, and thus pan portion 15 can be made compact and lightweight. Pan portion 15 is made compact and lightweight, and this lead to downsizing of a pan motor and power saving.

In addition, in surveillance camera 11, main-body-opposite-side loop portion 61 and tilt-opposite-side loop portion 63, which are provided in series to relay loop antenna 45, are disposed to be perpendicular to each other. Thereby, one relay loop antenna 45 can be disposed to be opposite to both of main-body-side loop antenna 41 which is provided around pan rotation shaft 43 and tilt-side loop antenna 55 which is provided around tilt rotation shaft 47.

In addition, in surveillance camera 11, since main-body-opposite-side loop portion 61 is disposed in main body portion 13, pan portion 15 can be made downsized and lightweight. Further, since tilt-side loop antenna 55 is disposed in pan portion 15, tilt portion 17 can be made downsized and lightweight. Pan portion 15 and tilt portion 17 are made compact and lightweight, and this lead to downsizing of the pan motor and the tilt motor and power saving.

Next, surveillance camera 71 according to a modification example of the present embodiment will be described with reference to FIGS. 8 and 9.

Figure 8:
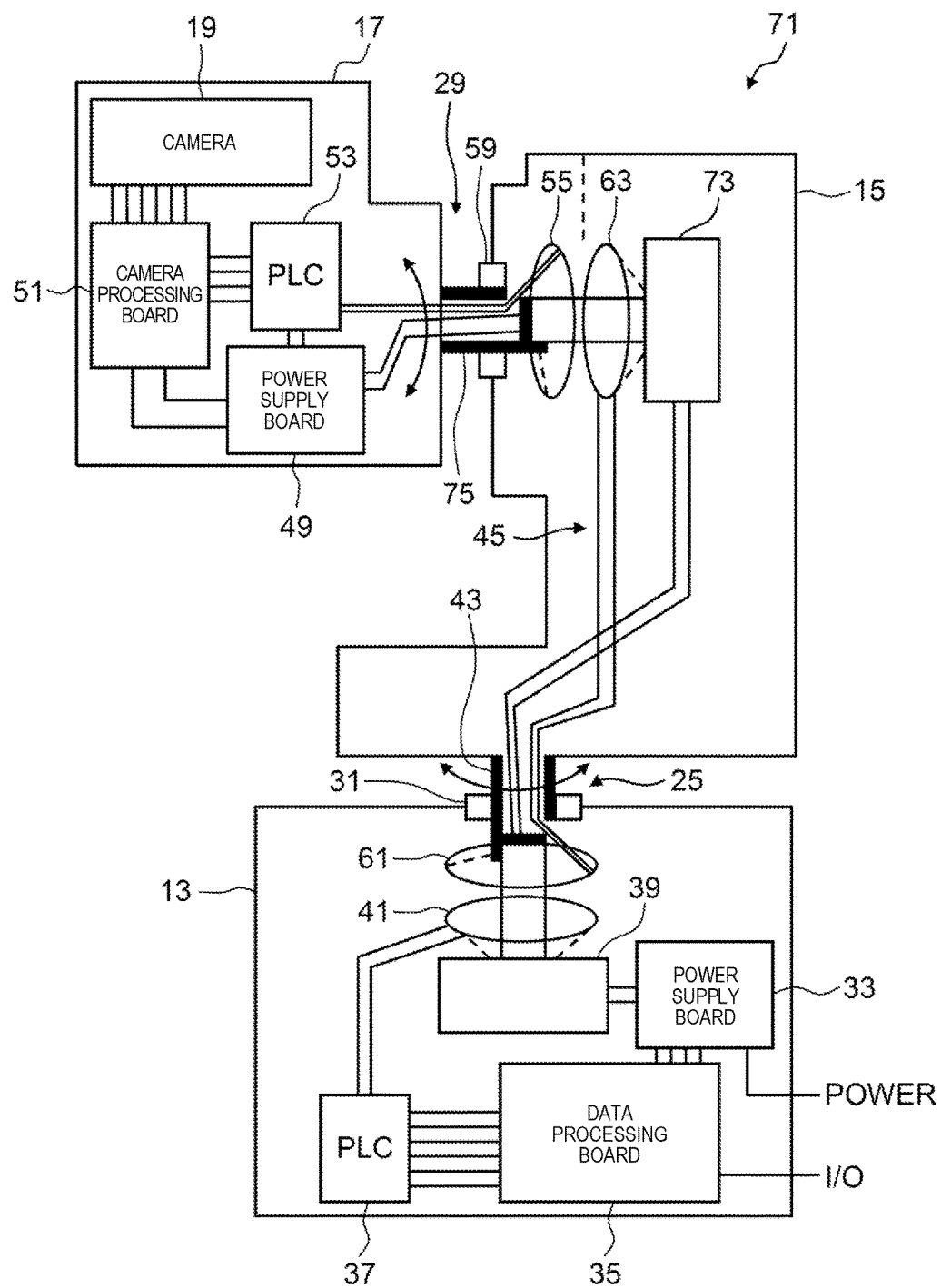
FIG. 8 is a block diagram of an imaging device according to a modification example of the present embodiment.

FIG. 8 is a block diagram of surveillance camera 71 according to a modification example. The same members as those illustrated in FIG. 4 are denoted by the same reference numerals, and repeated explanations are omitted. In surveillance camera 71 according to the modification example, power transmission in tilt rotation portion 29 is performed by slip ring 73. Thus, it is not necessary to insert twisted line 57 for power supply into tilt rotation shaft 75, and thus tilt rotation shaft 75 becomes thinner than tilt rotation shaft 47 of surveillance camera 11. The other configuration is the same as that of surveillance camera 11.

FIG. 9 is an explanatory diagram representing specifications of power, data, rotation, and rotation shafts in pan portion 15 and tilt portion 17 of surveillance camera 71 according to the modification example.

That is, in surveillance camera 71, power transmission in pan portion 15 is performed by slip ring 39, and power transmission in tilt portion 17 is performed by slip ring 73.

In addition, in surveillance camera 71, data transmission in pan portion 15 is performed by PLC communication, and data transmission in tilt portion 17 is performed by PLC communication.

Further, in surveillance camera 71, endless rotation in pan portion 15 is allowed, and endless rotation in tilt portion 17 is also allowed.

Furthermore, in surveillance camera 11, a thickness of the rotation shaft of pan portion 15 is extremely thin, and a thickness of the rotation shaft of tilt portion 17 is also extremely thin.

Thereby, in surveillance camera 71 according to the modification example, endless rotation of tilt rotation portion 29 can be made, and a thickness of tilt rotation shaft 75 can be extremely thin. Thus, the tilt motor can be further downsized, and the running cost can be further reduced.

Therefore, surveillance camera 11 according to the present embodiment can suppress an increase in the running cost while improving a transmission amount of information and reliability.

In the present embodiment, although tilt-side loop antenna 55 and tilt-opposite-side loop portion 63 are disposed in pan portion 15, tilt-side loop antenna 55 and tilt-opposite-side loop portion 63 may be disposed in the tilt portion. Similarly, although main-body-side loop antenna 41 and main-body-opposite-side loop portion 61 are disposed in main body portion 13, main-body-side loop antenna 41 and main-body-opposite-side loop portion 61 may be disposed in pan portion 15.

REFERENCE MARKS IN THE DRAWINGS 11 surveillance camera
13 main body portion
15 pan portion
17 tilt portion
19 camera
33 power supply board
35 data processing board
41 main-body-side loop antenna
43 pan rotation shaft
41 relay loop antenna
47 tilt rotation shaft
55 tilt-side loop antenna
61 main-body-opposite-side loop portion
63 tilt-opposite-side loop portion

The invention claimed is:

1. An imaging device comprising:
a main body portion in which a power supply unit and a data processing unit are provided;
a pan portion that rotates in a pan direction with respect to the main body portion;
a tilt portion that is provided with a camera and rotates in a tilt direction with respect to the pan portion;
a main-body-side loop antenna that is fixed to the main body portion;
a tilt-side loop antenna that is fixed to the tilt portion; and
a relay loop antenna that is fixed to the pan portion and in which a main-body-opposite-side loop portion opposite to the main-body-side loop antenna and a tilt-opposite-side loop portion opposite to the tilt-side loop antenna are connected to each other in series;
wherein the main-body-opposite-side loop portion is fixed to a pan rotation shaft which is disposed so as to protrude into the inside of the main body portion, and
wherein the tilt-side loop antenna is fixed to a tilt rotation shaft which is disposed so as to protrude into the inside of the pan portion.

2. The imaging device of claim 1,
wherein the pan portion rotates integrally with the pan rotation shaft, and the main-body-side loop antenna and the main-body-opposite-side loop portion are oppositely disposed in parallel in a direction perpendicular to the pan rotation shaft, and
wherein the tilt portion rotates integrally with the tilt rotation shaft perpendicular to the pan rotation shaft, and the tilt-side loop antenna and the tilt-opposite-side loop portion are oppositely disposed in parallel in a direction perpendicular to the tilt rotation shaft.

* * * * *